(12) United States Patent
Mahoney et al.

(10) Patent No.: US 6,773,484 B2
(45) Date of Patent: Aug. 10, 2004

(54) EXTENSIONLESS COHERENT JET SYSTEM WITH ALIGNED FLAME ENVELOPE PORTS

(75) Inventors: William John Mahoney, East Aurora, NY (US); Terrance T. Pavlack, Laporte, IN (US)

(73) Assignee: Praxair Technology, Inc., Danbury, CT (US)

( * ) Notice: Subject to any disclaimer, the term of this patent is extended or adjusted under 35 U.S.C. 154(b) by 67 days.

(21) Appl. No.: 10/179,220

(22) Filed: Jun. 26, 2002

(65) Prior Publication Data

US 2004/0000747 A1 Jan. 1, 2004

(51) Int. Cl.[7] ............................................. F23C 5/00
(52) U.S. Cl. ................................. 75/414; 266/225
(58) Field of Search .......................... 266/225; 75/414, 75/530; 431/8, 181

(56) References Cited

U.S. PATENT DOCUMENTS

| | | | |
|---|---|---|---|
| 4,622,007 A | 11/1986 | Gitman | 432/13 |
| 5,714,113 A | 2/1998 | Gitman et al. | 266/182 |
| 5,814,125 A | 9/1998 | Anderson et al. | 75/414 |
| 6,096,261 A | 8/2000 | Anderson et al. | 266/225 |
| 6,125,133 A * | 9/2000 | Mathur et al. | 373/8 |
| 6,139,310 A | 10/2000 | Mahoney et al. | 431/8 |
| 6,142,764 A | 11/2000 | Anderson et al. | 431/8 |
| 6,171,544 B1 | 1/2001 | Anderson et al. | 266/47 |
| 6,176,894 B1 | 1/2001 | Anderson et al. | 75/414 |
| 6,334,976 B1 | 1/2002 | Anderson et al. | 266/225 |
| 6,383,445 B1 | 5/2002 | Anderson et al. | 266/225 |
| 6,604,937 B1 * | 8/2003 | Mahoney | 431/8 |

* cited by examiner

Primary Examiner—Scott Kastler
(74) Attorney, Agent, or Firm—Stanley Ktorides

(57) ABSTRACT

A coherent jet lance and operating method wherein the need for a lance extension is eliminated using two rings of ports to deliver respectively fuel and oxidant flame envelope gases around the primary gas jets to maintain the gas jets coherent wherein the ports of the two rings are aligned on the lance face.

12 Claims, 2 Drawing Sheets

_____

EXTENSIONLESS COHERENT JET SYSTEM WITH ALIGNED FLAME ENVELOPE PORTS

TECHNICAL FIELD

This invention relates generally to coherent jet technology.

BACKGROUND ART

A recent significant advancement in the field of gas lancing is the development of the coherent jet technology disclosed, for example, in U.S. Pat. No. 5,814,125—Anderson et al. and in U.S. Pat. No. 6,171,544—Anderson et al. In the practice of this technology one or more high velocity gas jets ejected from one or more nozzles on a lance are maintained coherent over a relatively long distance by the use of a flame envelope around and along the high velocity gas jet(s). The flame envelope is formed by combusting fuel and oxidant ejected from the lance respectively from two rings of offset ports, an inner ring and an outer ring, around the high velocity gas jet nozzle(s). Typically the fuel for the flame envelope is ejected from the inner ring of ports and the oxidant for the flame envelope is ejected from the outer ring of ports. An extension on the lance perimeter forms a protected recirculation zone into which the high velocity gas jet(s) and the flame envelope fluids are provided from the nozzle(s) and ports. This recirculation zone enables some recirculation of the ejected fluids enabling improved ignition and improved stability of the flame envelope, thus enhancing the coherency and thus the length of the high velocity gas jet(s). The coherent jet(s) can be used to deliver gas into a liquid, such as molten metal, from a relatively long distance above the surface of the liquid. One very important application of this coherent jet technology is for providing oxygen for use in steelmaking operations such as electric arc furnaces and basic oxygen furnaces.

The recirculation extension, though constituting an improvement over earlier coherent jet systems, introduces certain problems concerning lance design and lance lifetime due to the need to water-cool the tip. These problems are of particular concern when the coherent jet system is used in a very harsh environment such as a basic oxygen furnace.

Accordingly, it is an object of this invention to provide a system which can produce effective coherent gas jets without the need for a lance extension or other element to establish a recirculation zone for the gases ejected from the lance.

SUMMARY OF THE INVENTION

The above and other objects, which will become apparent to those skilled in the art upon a reading of this disclosure, are attained by the present invention, one aspect of which is:

A method for establishing at least one coherent gas jet comprising:

(A) passing at least one gas jet out from at least one nozzle housed in a lance having a lance face, said lance face having a first ring of ports around said at least one nozzle and a second ring of ports around said at least one nozzle and radially spaced from said first ring of ports, with each port of the second ring of ports aligned with a port of the first ring of ports;

(B) passing fuel out from one of the rings of ports and passing oxidant out from the other ring of ports, wherein the said at least one gas jet and the fuel and the oxidant are passed out from the lance directly into an injection volume without passing through a recirculation zone formed by an extension on the lance; and (C) combusting the fuel and the oxidant passed out from the first and second rings of ports to produce a flame envelope around the said at least one gas jet.

Another aspect of the invention is:

A coherent jet lance comprising:

(A) a lance having a lance face and having at least one nozzle having an opening at the lance face and having no extension to form a recirculation zone adjacent the lance face;

(B) a first ring of ports around the nozzle opening(s) and a second ring of ports radially spaced from the first ring of ports around the nozzle opening(s), with each port of the second ring of ports aligned with a port of the first ring of ports; and (C) means for providing fuel to one of the rings of ports and means for providing oxidant to the other ring of ports.

As used herein the term "lance face radius" means an imaginary line running from the center of a lance face to the perimeter of the lance face.

As used herein the term "aligned" means intercepting the same lance face radius.

As used herein the term "extension" means any structure, whether or not physically connected to a lance, which serves to form a protected volume or zone adjacent to the lance face.

As used herein the term "lance face" means the surface of a lance abutting an injection volume.

As used herein the term "coherent jet" means a gas jet which is formed by ejecting gas from a nozzle and which has a velocity and momentum profile along a length of at least 20d, where d is the exit diameter of the nozzle, which is similar to its velocity and momentum profile upon ejection from the nozzle. Another way of describing a coherent jet is a gas jet which has little or no change in its diameter for a distance of at least 20d.

As used herein the term "length" when referring to a coherent gas jet means the distance from the nozzle from which the gas is ejected to the intended impact point of the coherent gas jet or to where the gas jet ceases to be coherent.

Figure 1:
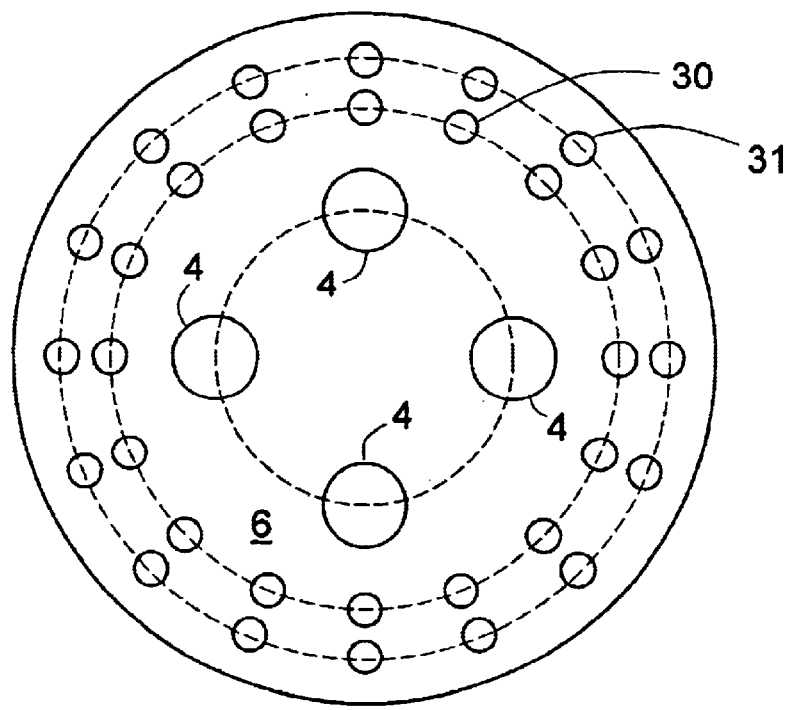
FIG. 1 is a head on view of one preferred embodiment of a lance face.

The numerals in the Drawings are the same for the common elements.

DETAILED DESCRIPTION

The invention will be described in detail with reference to the Drawings.

Figure 2:
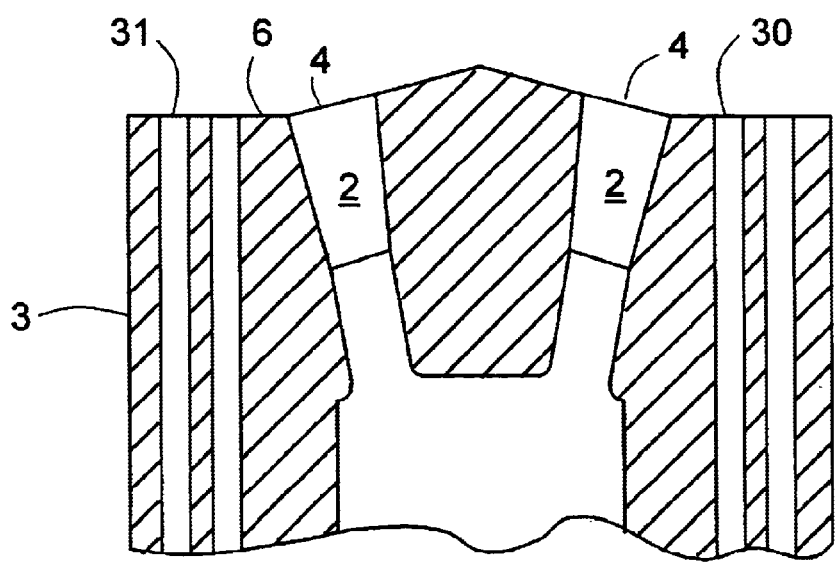
FIG. 2 is a cross sectional view of one preferred embodiment of a lance having such lance face which may be used in the practice of this invention.
Figure 3:
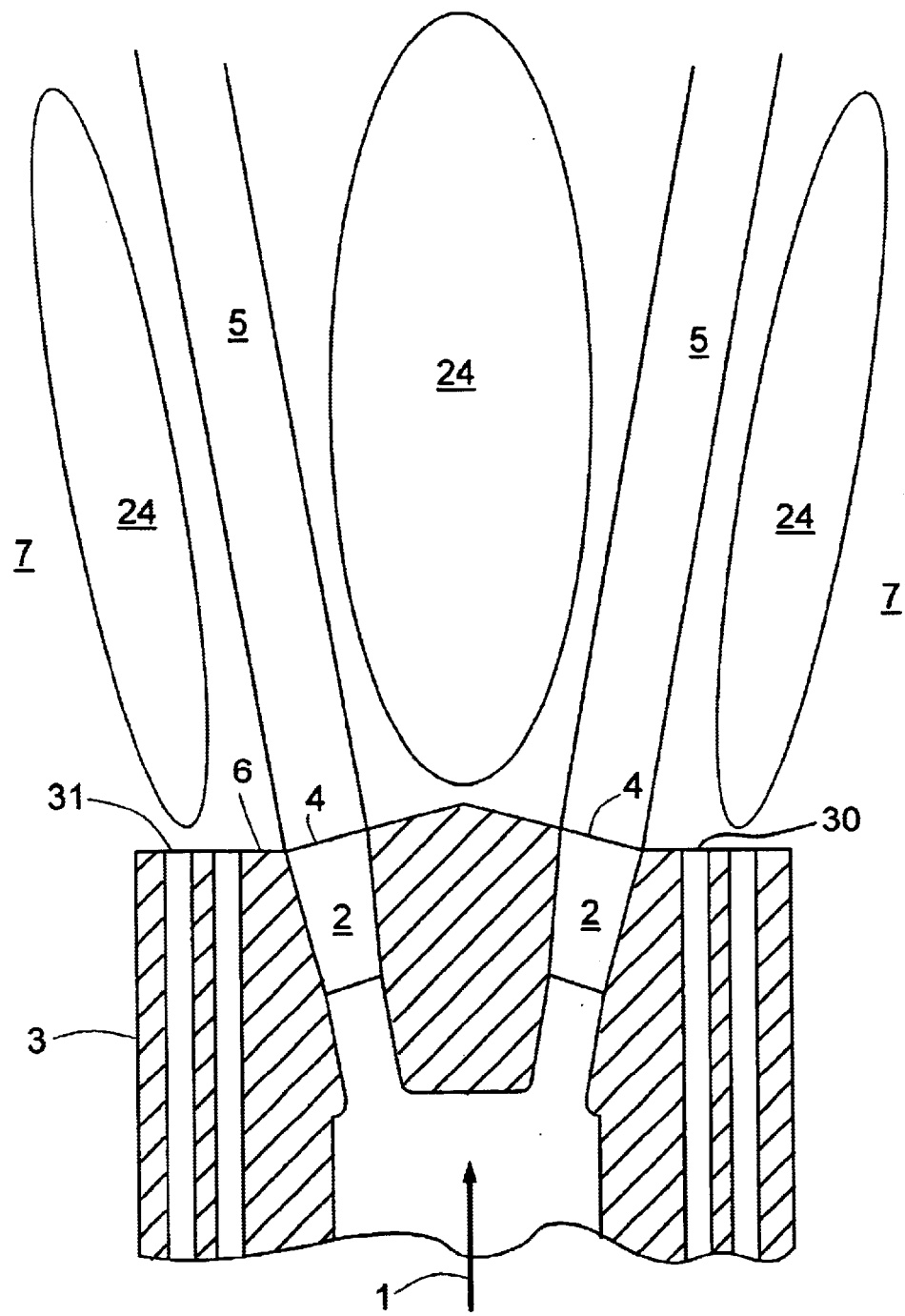
FIG. 3 illustrates the embodiment of the invention illustrated in FIGS. 1 and 2 in operation.

Referring now to FIGS. 1, 2 and 3, gas as shown by flow arrow 1, is passed through at least one nozzle 2, preferably a converging/diverging nozzle, and then out from lance 3 through nozzle opening or openings 4 on lance face 6 to form a coherent gas jet stream or streams 5 in injection volume 7. Typically the velocity of the gas stream(s) 5 is within the range of from 700 to 3000 feet per second (fps).

Preferably the velocity of the gas stream(s) 5 is supersonic when it is formed upon ejection from the lance face and remains supersonic for a distance of at least 20d. Although the Drawings illustrate an embodiment employing four coherent gas jets ejected from the lance respectively through four nozzles, the number of gas jets ejected from the lance through respective nozzles in the practice of this invention may be within the range of from 1 to 6. Preferably the injection volume into which the coherent gas jets are injected is a metal producing furnace such as a steelmaking furnace. Most preferably, when a plurality of nozzles is employed, each nozzle is angled away from each other and from the center axis of the lance.

Any effective gas may be used as the gas for forming coherent jet or jets in the practice of this invention. Among such gases one can name oxygen, nitrogen, argon, carbon dioxide, hydrogen, helium, steam and hydrocarbon gases. Also mixtures comprising two or more gases, e.g. air, may be used as such gas in the practice of this invention.

A first ring 30 of ports is located on the lance around the nozzle opening or openings 4 and a second ring 31 of ports is located on the lance around the nozzle opening or opening 4 and radially spaced outward from the first ring 30 of ports. Ring 30 is preferably a circle having a diameter within the range of from 1.5 to 20 inches and ring 31 is preferably a circle having a diameter within the range of from 1.75 to 23 inches. Each of rings 30 and 31 will generally comprise from 4 to 48 ports and each port is preferably a circle having a diameter within the range of from 0.05 to 1.25 inches. Each port of the second ring 31 of ports is aligned with a port of the first ring 30 of ports although the efficacy of the invention will not be lost if either first ring 30 or second ring 31 or both rings 30 and 31 contain one or a small number of additional ports which are not aligned with a port on the other ring. Fuel is provided to one of the two rings of ports, preferably the inner or first ring 30, and oxidant is provided to the other ring of ports, preferably the outer or second ring 31. The fuel and oxidant are ejected from lance 3 from their respective ring of ports into injection volume 7. The velocity of the fuel and oxidant ejected from the ring of ports may be subsonic, sonic or supersonic. Sonic and supersonic velocity of the injected fuel and oxidant enhances the rejection of foreign matter from entering and plugging the ports, which is especially important when the invention is employed in a harsh environment such as a steelmaking furnace. If desired, the velocity of the injected fuel and oxidant may be supersonic at a velocity of greater than Mach 1 up to Mach 2.

The fuel ejected from the ports is preferably gaseous and may be any fuel such as methane or natural gas. The oxidant ejected from the ports on the other ring may be air, oxygen-enriched air having an oxygen concentration exceeding that of air, or commercial oxygen having an oxygen concentration of at least 90 mole percent. Preferably the oxidant is a fluid having an oxygen concentration of at least 25 mole percent.

The fuel and oxidant passed out from the lance form a gas envelope around gas jet(s) 5 which combusts to form a flame envelope or flame shroud 24 around the gas jet(s) 5 within the injection volume such as a molten metal furnace. Flame envelope 24 around the gas streams 5 serves to keep ambient gas from being drawn into the gas streams, thereby keeping the velocity of gas streams from significantly decreasing and keeping the diameter of the gas streams from significantly increasing, for at least a distance of 20d from the respective nozzle exit. That is, the flame envelope or flame shroud 24 serves to establish and maintain gas streams 5 as coherent jets for a distance of at least 20d from the respective nozzle exit.

An important aspect of this invention and a significant advantage of this invention is the ability to form effective coherent gas jets from a lance without the need to employ an extension on the lance. Heretofore a lance extension has been used to form a protected recirculation zone adjacent the lance face to improve the ignition and combustion of the flame shroud gases which are injected into this protected recirculation zone, thus improving the coherency of the gas jets. While the use of such a lance extension is a significant improvement over the initial coherent gas jet practice, there are problems with the use of such an extension. In the practice of this invention, the gases ejected from the lance are passed directly into the injection volume without passing through a protected zone or recirculation zone formed by a lance extension, yet the improved coherency observed with the use of a lance extension is still achieved.

Tests were conducted to evaluate the effectiveness of the invention and comparative tests were conducted to demonstrate the advantage of the invention. The fuel used in the tests was natural gas and the oxidant used in the tests had an oxygen concentration of 99 mole percent and is referred to as the secondary oxygen. In each test the lance had four nozzles for the provision of the gas jets. The gas for the gas jets was oxygen having a purity of 99 mole percent and is referred to as the main oxygen. The test results reported below are presented for illustrative purposes and are not intended to be limiting.

Each of the four nozzles was designed to admit 10,000 standard cubic feet per hour (scfh) of main oxygen with a supply pressure of 165 pounds per square inch gauge (psig) for a total main oxygen provision of 40,000 scfh. Each nozzle had exit and throat diameters of 0.38 inch and 0.26 inch respectively and was angled outward from the lance center axis by 12 degrees. The fuel was provided to an inner ring of 16 ports each having a diameter of 0.154 inch where the ring diameter was 1.56 inches. For purposes of a comparative test the secondary oxygen was provided to an outer ring of 12 ports each having a diameter of 0.23 inch where the ring diameter was 2.125 inches and where the ports were offset or staggered with respect to the ports of the inner ring. The fuel and secondary oxygen flows were 5000 scfh and 4000 scfh respectively which resulted in velocities of 670 fps and 320 fps respectively. The lance had a recirculation extension of 0.5 inch in length. This conventional design produced good coherent jets of about 18 inches in length but the length fell to 16 inches when the recirculation extension length was reduced to 0.25 inch and fell further to 14 inches when the recirculation extension length was reduced to 0.1 inch. Without any recirculation extension the flame envelope became unstable and the gas jet lost coherency. The test was repeated but using the invention and wherein the outer ring had 16 ports of 0.199 inch diameter each aligned with a port on the inner ring. There was no reduction in the length of the coherent jets and, even with no extension on the lance, the coherent jets were stable and had a length of 18 inches.

In addition to the tests reported above which used a four nozzle arrangement similar to that illustrated in the Drawings, tests and comparative tests similar to those reported above were conducted with a lance having a single nozzle and with the inner ring having a 2.0 inch diameter and having 16 ports of 0.154 inch diameter and the outer ring having a 2.75 inch diameter and having 16 ports of 0.199 inch diameter. In one test series the outer ring ports were offset relative to the inner ring ports and in another test series the outer ring ports were aligned with the inner ring ports. The nozzle had exit and throat diameters of 0.81 inch and 0.62 inch respectively and the main oxygen was supplied at 36,000 scfh at 100 psig. The fuel and secondary oxygen flowrates and velocities were the same as in the previously reported tests. When the extension length was decreased to less than 0.5 inch the flame shroud exhibited popping instabilities with the offset or nonaligned configuration and the coherent jet length dropped significantly from about 50 inches to less than 40 inches. However, with the aligned configuration of this invention, the flame envelope remained stable and the coherent jet length remained at about 50 inches even with no extension on the lance.

Although the invention has been described in detail with reference to certain preferred embodiments, those skilled in the art will recognize that there are other embodiments of the invention within the spirit and the scope of the claims.

What is claimed is:

1. A method for establishing at least one coherent gas jet comprising:
    (A) passing at least one gas jet out from at least one nozzle housed in a lance having a lance face, said lance face having a ring of ports around said at least one nozzle and a second ring of ports around said at least one nozzle and radially spaced from said first ring of ports, with each port of the second ring of ports aligned with a port of the first ring of ports;
    (B) passing fuel out from one of the rings of ports and passing oxidant out from the other ring of ports, wherein the said at least one gas jet and the fuel and the oxidant are passed out from the lance directly into an injection volume without passing through a recirculation zone formed by an extension on the lance; and
    (C) combusting the fuel and the oxidant passed out from the first and second rings of ports to produce a flame envelope around the said at least one gas jet.

2. The method of claim 1 wherein the gas jet(s) passed out from the lance have a supersonic velocity.

3. The method of claim 1 wherein a plurality of gas jets are passed out from the lance.

4. The method of claim 1 wherein the velocity of the fuel and the oxidant passed out from the first and second rings of ports is subsonic.

5. The method of claim 1 wherein the velocity of the fuel and the oxidant passed out from the first and second rings of ports is sonic.

6. The method of claim 1 wherein the velocity of the fuel and the oxidant passed out from the first and second rings of ports is supersonic.

7. The method of claim 1 wherein the fuel is passed out from the first ring of ports and the oxidant is passed out from the second ring of ports.

8. The method of claim 1 wherein the said at least one gas jet and the fuel and the oxidant are passed out from the lance into a molten metal furnace.

9. The method of claim 1 wherein the said at least one gas jet each travel for a distance of at least 20d, where d is the exit diameter of the nozzle from which said gas jet is passed, while maintaining the diameter of said gas jet substantially constant.

10. A coherent jet lance comprising:
    (A) a lance having a lance face and having at least one nozzle having an opening at the lance face and having no extension to form a recirculation zone adjacent the lance face;
    (B) a first ring of ports around the nozzle opening(s) and a second ring of ports radially spaced from the first ring of ports around the nozzle opening(s), with each port of the second ring of ports aligned with a port of the first ring of ports; and
    (C) means for providing fuel to one of the rings of ports and means for providing oxidant to the other ring of ports.

11. The coherent jet lance of claim 10 having a plurality of nozzles.

12. The coherent jet lance of claim 11 wherein each nozzle is angled away from the lance centerline.

* * * * *